(12) United States Patent
Zhong et al.

(10) Patent No.: US 8,953,140 B2
(45) Date of Patent: Feb. 10, 2015

(54) METHOD FOR SETTING PRE-TILT ANGLE OF LIQUID CRYSTAL MOLECULE

(71) Applicant: Shenzhen China Star Optoelectronics Technology Co., Ltd., Shenzhen, Guangdong Province (CN)

(72) Inventors: Xinhui Zhong, Shenzhen (CN); Xing Feng, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 215 days.

(21) Appl. No.: 13/807,715

(22) PCT Filed: Nov. 20, 2012

(86) PCT No.: PCT/CN2012/084856
§ 371 (c)(1),
(2) Date: Dec. 28, 2012

(87) PCT Pub. No.: WO2014/075322
PCT Pub. Date: May 22, 2014

(65) Prior Publication Data
US 2014/0132864 A1    May 15, 2014

(30) Foreign Application Priority Data

Nov. 14, 2012  (CN) .......................... 2012 1 0457741

(51) Int. Cl.
*G02F 1/1337* (2006.01)
*G02F 1/1333* (2006.01)
(52) U.S. Cl.
CPC .............................. *G02F 1/133788* (2013.01)
USPC ........................................... 349/191; 349/93

(58) Field of Classification Search
USPC ..................................................... 349/191, 93
See application file for complete search history.

(56) References Cited

U.S. PATENT DOCUMENTS

| 5,912,717 A | 6/1999 | Sugiyama et al. |
| 2012/0075558 A1* | 3/2012 | Kishida et al. ................ 349/106 |
| 2013/0120705 A1* | 5/2013 | Zhao et al. .................... 349/191 |

FOREIGN PATENT DOCUMENTS

| CN | 1564962 A | 1/2005 |
| CN | 101498886 A | 8/2009 |
| CN | 102289107 A | 12/2011 |

* cited by examiner

*Primary Examiner* — Wen-Ying P Chen
(74) *Attorney, Agent, or Firm* — Cheng-Ju Chiang

(57) ABSTRACT

A method for setting a pre-tilt angle of liquid crystal molecules includes (1) providing liquid crystal material, a CF substrate, and a TFT substrate; (2) arranging the substrates to form a gap therebetween in which the liquid crystal material is filled to form a liquid crystal cell; (3) providing a drive control circuit that generates driving voltages and connecting the drive control circuit to the TFT substrate; (4) providing a small-amplitude oscillation device and an irradiation intensity variable ultraviolet light source and positioning the liquid crystal cell on the oscillation device; (5) activating the oscillation device to cause the liquid crystal cell to make small-amplitude oscillation and conducting on the drive control circuit to supply driving voltages to drive the liquid crystal material, the ultraviolet light source being applied to irradiate the liquid crystal cell with ultraviolet lights of different intensities; and (6) repeating step (5) for at least one time.

10 Claims, 5 Drawing Sheets

METHOD FOR SETTING PRE-TILT ANGLE OF LIQUID CRYSTAL MOLECULE

BACKGROUND OF THE INVENTION

1. Field of the Invention

The present invention relates to a method for manufacturing a liquid crystal display device, and in particular to a method for setting a pre-tilt angle of liquid crystal molecules contained in the liquid crystal display device.

2. The Related Arts

A liquid crystal display device is a kind of displaying device, which comprises a liquid crystal material enclosed between two opposite substrates. The displaying device effects light switching with optical anisotropy of the liquid crystal molecule by applying electrical excitation. Also, with the anisotropy of refractivity of liquid crystal molecule, application of electrical voltage to the liquid crystal molecule is made to reorient the axis of anisotropy of refractivity in order to control the of light intensity transmitting through the liquid crystal molecule for achieving control of luminance. Whether a liquid crystal display device is good or not is primarily determined by the liquid crystal panel thereof, for the quality of the liquid crystal panel directly affects the viewing of the image. Further, the liquid crystal panel takes more half of the cost of the entire device, making it the primary factor that affecting the cost of the liquid crystal display device. Apparently, to make a good selection of liquid crystal display device, the first factor to be taken into account is the liquid crystal panel thereof. The liquid crystal panel is generally made of two glass substrates and a liquid crystal material that is arranged between the glass substrates and does not gives off light by itself and thus requires illumination by a backlight source.

Driving liquid crystal is often achieved with two techniques, namely passive matrix driving and active matrix driving. With the increasing demand of higher resolution, an active matrix display mode using thin-film transistor (TFT) is currently the primary mode of liquid crystal displaying. In a liquid crystal display incorporating such a thin-film transistor structure, when a voltage is applied to the liquid crystal molecules while irradiating the liquid crystal molecules with ultraviolet light, it is actually to set the pre-tilt angle of the liquid crystal molecule by applying a TFT conduction voltage to each gate line and a required voltage to each data line and at the same time exposing the liquid crystal molecule to the irradiation of ultraviolet.

As mentioned above, setting the pre-tilt angle of the liquid crystal molecule is done with the irradiation of ultraviolet light, where the liquid crystal material contained in a liquid crystal cell comprises photo- or heat-polymerizable monomers. To have the photo- or heat-polymerizable monomers completely polymerized, when a driving voltage is applied to the liquid crystal panel material that contains the photo- or heat-polymerizable monomers (the driving voltage being applied to cause a small-range rotation of liquid crystal molecules in order to set the pre-tilt angle of the liquid crystal molecule in advance), a light that comprises an intense ultraviolet component is irradiated on the liquid crystal cell. However, increasing the intensity of the irradiation light or the intensity of the ultraviolet light contained in the irradiation light will cause deterioration of transmittance of the liquid crystal material, leading to an issue of lowering of contrast. To avoid the issue of deterioration of contrast caused by lowered transmittance, irradiation may be made with low intensity ultraviolet light but for an extended period for sufficiently polymerizing the photo- or heat-polymerizable monomers. However, this process inevitably lowers down the manufacturing efficiency of liquid crystal display devices.

FIG. 1 is a view showing the principle of setting pre-tilt angle of liquid crystal molecule contained in a photo- or heat-polymerizable monomer based liquid crystal material. In the drawing, without application of driving voltage, the liquid crystal molecules 100 are aligned perpendicularly between two substrates 300. When a driving voltage is applied, the liquid crystal molecules 100 are rotated by 0-90°. To increase the response speed of a liquid crystal display device, the liquid crystal molecules 100 are set with a pre-tilt angle, of which the size is controlled within 2°. Under the condition that a voltage is applied to have the liquid crystal molecules 100 rotated to the pre-tilt angle, irradiation of light comprising ultraviolet component or ultraviolet light 400 is made on the photo- or heat-polymerizable monomers 200 causes the photo- or heat-polymerizable monomers 200 to polymerize so as to set the pre-tilt angle for constraining the alignment direction of the liquid crystal molecules 100.

FIG. 2 is a plot illustrating image sticking rate varying with exposure of ultraviolet light. The plot shows that the image sticking rate is related to the amount of exposure. When exposure is relatively small, sufficiently polymerizing the monomers may not be possible and thus, no strong cross-linked structure can be obtained. Consequently, the probability of image sticking is increased.

FIG. 3 is schematic view showing some known solutions of ultraviolet light irradiation, including (1) applying driving voltage while irradiating the light; (2) first irradiating the light and at the same time applying driving voltage and then removing the driving voltage with only irradiation of the light; (3) first irradiating the light and then applying driving voltage while irradiating the light; and (4) first irradiating the light and the applying driving voltage while irradiating the light, and then removing the driving voltage. In the drawing, in irradiating a liquid crystal material that contains photo- or heat-polymerizable monomers with a light comprising ultraviolet component of predetermined intensity or ultraviolet, a voltage that causes the liquid crystal molecules to rotate to the pre-tilt angle is applied, and afterwards, a light that comprises an ultraviolet component or ultraviolet light having other intensity is used to irradiate the liquid crystal cell. However, when the liquid crystal material is irradiated with light without application of driving voltage, since no external driving exists, the liquid crystal molecules may deviates from the pre-tilt angle. Under this condition, some of the polymers that have already been polymerized imposes a limitation to the liquid crystal molecules that leads to difference of light transmittance in the liquid crystal material located in this area, leading to difference of contrast.

Chinese Patent Application No. 02819491.8 proposes a solution of irradiation for setting pre-tilt angle of liquid crystal molecule with irradiation of light:

(1) Before a step of setting pre-tilt angle for liquid crystal molecules, a voltage Vx that is greater than threshold voltage for rotation of liquid crystal molecules and smaller than saturation voltage for rotation of liquid crystal molecules is applied. Afterwards, the voltage Vx is changed to V and during the application of voltage V, a light comprising an ultraviolet component or an ultraviolet light is applied to irradiate the above liquid crystal material to polymerize the photo- or heat-polymerizable monomers so as to constrain the pre-tilt angle of the liquid crystal molecules.

(2) After the step of setting pre-tilt angle through polymerization of the photo- or heat-polymerizable monomers, irradiating light comprising ultraviolet component or ultraviolet light on the liquid crystal material under a condition of applying a voltage that does not cause rotation of the liquid crystal molecules or applying no voltage at all.

(3) In the step of irradiating the photo- or heat-polymerizable monomers with the light comprising ultraviolet component or ultraviolet light, the step is repeated for at least twice.

Shortcomings of the above method are as follows. The number of the step of making the photo- or heat-polymerizable monomers of the liquid crystal material polymerized is large and each of these steps requires different components and intensity of the irradiation light. Further, a sharp boundary is present between these steps and the parameters of each step are set different, such as, the time when the driving voltage is applied in these steps, variation of light intensity among the steps or the variation of intensity of ultraviolet light among these steps.

Further, under the condition of irradiation with light comprises ultraviolet component or ultraviolet light with application of no driving voltage or a voltage that does not cause rotation of liquid crystal molecules, the pre-tilt angle of the liquid crystal molecules varies. If the pre-tilt angle of the liquid crystal molecules formed with the photo- or heat-polymerizable monomers being completely polymerized is of relatively large variation, then different light transmittance may be induced in this area, leading to abnormal contrast. After the photo- or heat-polymerizable monomers are polymerized, under the condition of applying no driving voltage or a voltage that is insufficient to cause rotation of the liquid crystal molecules, using a light comprising ultraviolet component or ultraviolet light of the same intensity to irradiate the above liquid crystal material containing the photo- or heat-polymerizable monomers for an extended period of time will similarly lower down the manufacturing efficiency of liquid crystal display devices.

Further, in irradiating the above liquid crystal material containing the photo- or heat-polymerizable monomers with light comprising ultraviolet component or ultraviolet light, since a TFT substrate often comprises portions that may shield the light, the photo- or heat-polymerizable monomers contained in the portion of the liquid crystal material that is not irradiated by the ultraviolet light may not be completely polymerized, and with the migration of the liquid crystal material, this portion of liquid crystal may appear in the display zone. The photo- or heat-polymerizable monomers of this portion show a weak cross-linked structure caused by incomplete polymerization may result in image sticking in a normal display mode.

SUMMARY OF THE INVENTION

An object of the present invention is to provide a method for setting a pre-tilt angle of liquid crystal molecules, which enables photo- or heat-polymerizable monomers to completely polymerize and the liquid crystal molecule shows a consistent pre-tilt angle so as to provide the liquid crystal material with consistent light transmittance thereby ensuring contrast of liquid crystal display device, improving the performance of the liquid crystal display device, and also increasing the manufacturing efficiency of the liquid crystal display device.

To achieve the object, the present invention provides a method for setting a pre-tilt angle of liquid crystal molecules, which comprises the following steps:

(1) providing a liquid crystal material, a CF substrate, and a TFT substrate;

(2) arranging the CF substrate and the TFT substrate parallel with each other to form an accommodation gap therebetween and filling the liquid crystal material in the accommodation gap to form a liquid crystal cell;

(3) providing a drive control circuit that generates a plurality of driving voltages and electrically connecting the drive control circuit to the TFT substrate;

(4) providing a small-amplitude oscillation device and an irradiation intensity variable ultraviolet light source and positioning the liquid crystal cell on the small-amplitude oscillation device;

(5) activating the small-amplitude oscillation device to cause the liquid crystal cell to make small-amplitude oscillation and conducting on the drive control circuit to supply a plurality of driving voltages to drive the liquid crystal material, wherein during this process, the ultraviolet light source is applied to irradiate the liquid crystal cell with ultraviolet lights of different intensities; and (6) repeating the operation of step (5) on the liquid crystal cell at least one time in order to complete setting of pre-tilt angle.

The TFT substrate comprises light-shielding patterns formed thereon.

The liquid crystal material comprises photo- or heat-polymerizable monomers and liquid crystal molecules, the photo- or heat-polymerizable monomers being polymerizable when irradiated with ultraviolet light.

The drive control circuit drives the liquid crystal molecules of the liquid crystal material to rotate and when the drive circuit supplies no driving voltage, the liquid crystal molecules are perpendicular to the CF substrate or the TFT substrate.

The small-amplitude oscillation device of step (5) causes the liquid crystal cell to make oscillation of small amplitude and the small amplitude is insufficient to cause a change of the rotation angle of the liquid crystal molecules and is also insufficient to cause a large scale of flow of the liquid crystal molecules.

The drive control circuit generates high and low levels, the high level causing the liquid crystal molecules to make a small angle rotation, the low level being insufficient to cause the liquid crystal molecules to make a small angle rotation.

The ultraviolet light source generates first, second, third, and fourth irradiation intensities, the first irradiation intensity>the second irradiation intensity>the third irradiation intensity>the fourth irradiation intensity.

Step (5) comprises the following steps:

(A) activating the small-amplitude oscillation device to cause the liquid crystal cell to make small-amplitude oscillation;

(B) in a first time period, conducting on the drive control circuit to output the high level to cause the liquid crystal molecules to make a small angle rotation and also applying the first irradiation intensity of the ultraviolet light source to irradiate the liquid crystal cell so as to make the photo- or heat-polymerizable monomers start to polymerize;

(C) in a second time period, conducting on the drive control circuit to output the high level and also applying the second irradiation intensity of the ultraviolet light source to irradiate the liquid crystal cell;

(D) in a third time period, conducting on the drive control circuit to output the low level and also applying the fourth irradiation intensity of the ultraviolet light source to irradiate the liquid crystal cell; and (E) in a fourth time period, shutting off the drive control circuit and applying the third irradiation intensity of the ultraviolet light source to irradiate the liquid crystal cell so as to have the photo- or heat-polymerizable monomers sufficiently polymerized.

The first time period<the second time period<the fourth time period<the third time period.

The present invention also provides a method for setting a pre-tilt angle of liquid crystal molecules, which comprises the following steps:

(1) providing a liquid crystal material, a CF substrate, and a TFT substrate;

(2) arranging the CF substrate and the TFT substrate parallel with each other to form an accommodation gap therebetween and filling the liquid crystal material in the accommodation gap to form a liquid crystal cell;

(3) providing a drive control circuit that generates a plurality of driving voltages and electrically connecting the drive control circuit to the TFT substrate;

(4) providing a small-amplitude oscillation device and an irradiation intensity variable ultraviolet light source and positioning the liquid crystal cell on the small-amplitude oscillation device;

(5) activating the small-amplitude oscillation device to cause the liquid crystal cell to make small-amplitude oscillation and conducting on the drive control circuit to supply a plurality of driving voltages to drive the liquid crystal material, wherein during this process, the ultraviolet light source is applied to irradiate the liquid crystal cell with ultraviolet lights of different intensities; and (6) repeating the operation of step (5) on the liquid crystal cell at least one time in order to complete setting of pre-tilt angle;

wherein the TFT substrate comprises light-shielding patterns formed thereon;

wherein the liquid crystal material comprises photo- or heat-polymerizable monomers and liquid crystal molecules, the photo- or heat-polymerizable monomers being polymerizable when irradiated with ultraviolet light;

wherein the drive control circuit drives the liquid crystal molecules of the liquid crystal material to rotate and when the drive circuit supplies no driving voltage, the liquid crystal molecules are perpendicular to the CF substrate or the TFT substrate;

wherein the small-amplitude oscillation device of step (5) causes the liquid crystal cell to make oscillation of small amplitude and the small amplitude is insufficient to cause a change of the rotation angle of the liquid crystal molecules and is also insufficient to cause a large scale of flow of the liquid crystal molecules;

wherein the drive control circuit generates high and low levels, the high level causing the liquid crystal molecules to make a small angle rotation, the low level being insufficient to cause the liquid crystal molecules to make a small angle rotation;

wherein the ultraviolet light source generates first, second, third, and fourth irradiation intensities, the first irradiation intensity>the second irradiation intensity>the third irradiation intensity>the fourth irradiation intensity;

wherein step (5) comprises the following steps:

(A) activating the small-amplitude oscillation device to cause the liquid crystal cell to make small-amplitude oscillation, (B) in a first time period, conducting on the drive control circuit to output the high level to cause the liquid crystal molecules to make a small angle rotation and also applying the first irradiation intensity of the ultraviolet light source to irradiate the liquid crystal cell so as to make the photo- or heat-polymerizable monomers start to polymerize, (C) in a second time period, conducting on the drive control circuit to output the high level and also applying the second irradiation intensity of the ultraviolet light source to irradiate the liquid crystal cell, (D) in a third time period, conducting on the drive control circuit to output the low level and also applying the fourth irradiation intensity of the ultraviolet light source to irradiate the liquid crystal cell, and (E) in a fourth time period, shutting off the drive control circuit and applying the third irradiation intensity of the ultraviolet light source to irradiate the liquid crystal cell so as to have the photo- or heat-polymerizable monomers sufficiently polymerized; and wherein the first time period<the second time period<the fourth time period<the third time period.

The efficacy of the present invention is that the present invention provides a method for setting a pre-tilt angle of liquid crystal molecules, which applies ultraviolet lights of different intensities to carry out irradiation in different time periods, uses different driving voltages to drive liquid crystal molecules, and also applies a small-amplitude oscillation device to cause a liquid crystal cell to make small-amplitude oscillation so as to have all liquid crystal molecules to be irradiated by ultraviolet to the greatest extent, making the photo- or heat-polymerizable monomers sufficiently polymerized to eliminate image sticking phenomenon. Further, the liquid crystal molecules show consistent pre-tilt angle so that the liquid crystal material shows consistent light transmittance thereby ensuring the contrast of a liquid crystal display device, improving the performance of the liquid crystal display device, and also increasing the manufacturing efficiency of the liquid crystal display device.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
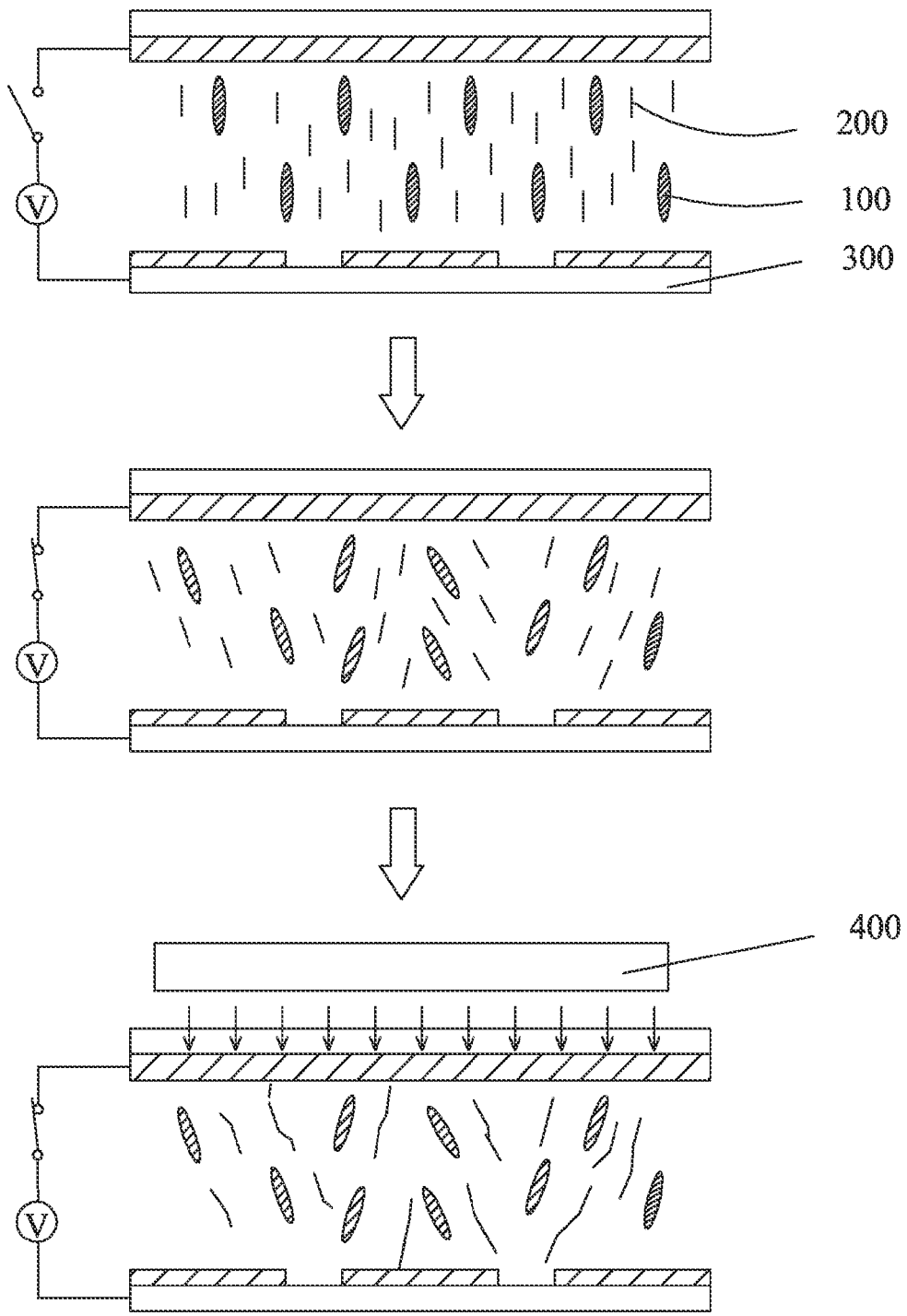
FIG. 1 is a view showing the principle of setting pre-tilt angle of liquid crystal molecule contained in a photo- or heat-polymerizable monomer based liquid crystal material.
Figure 2:
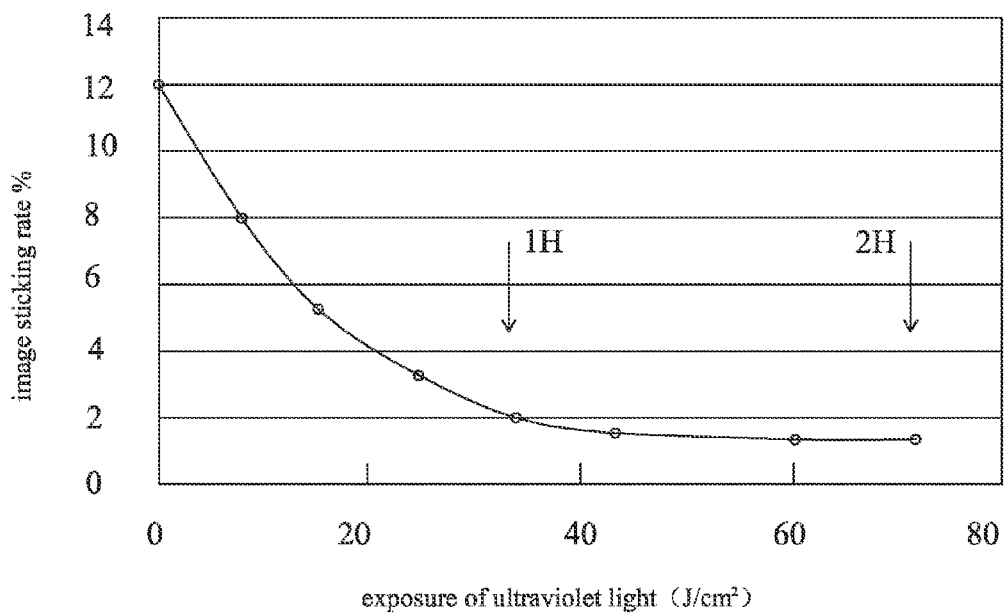
FIG. 2 is a plot illustrating image sticking rate varying with exposure of ultraviolet light.
Figure 3:
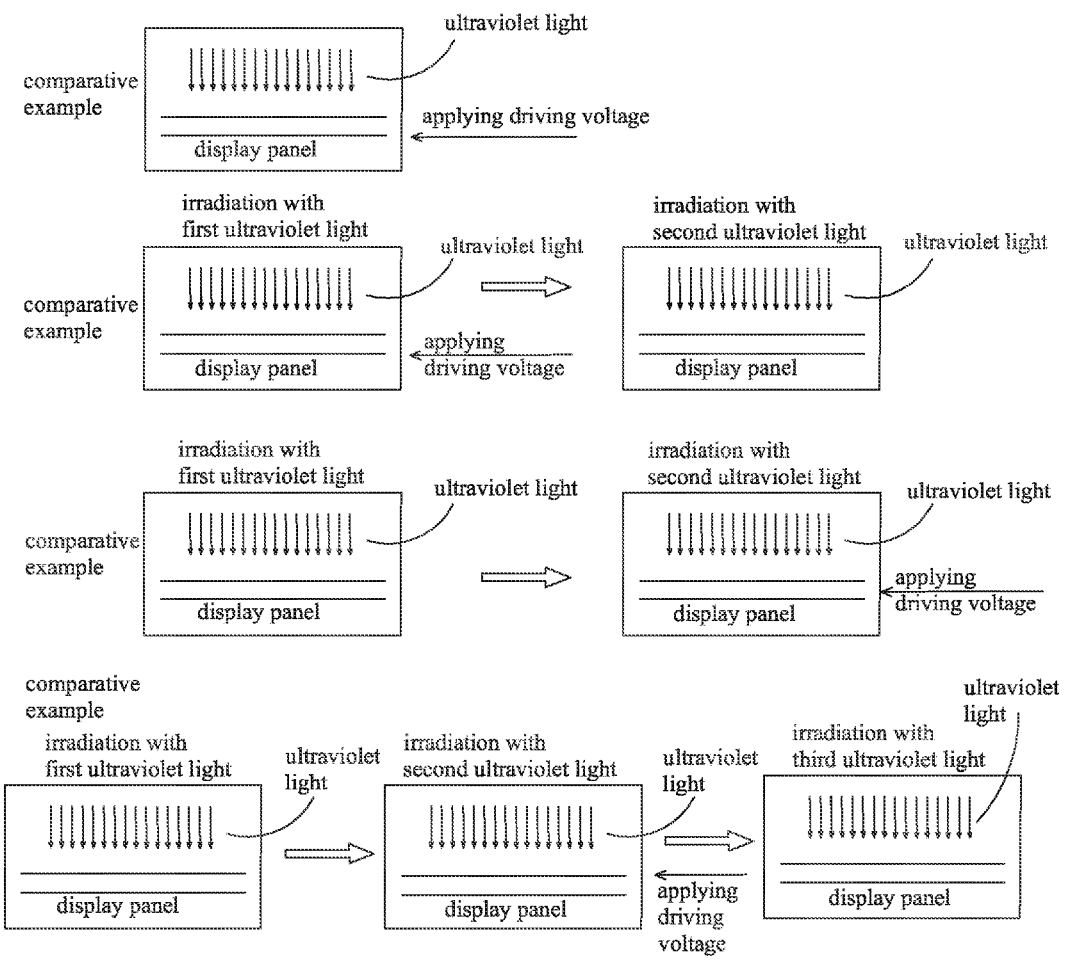
FIG. 3 is schematic view showing some known solutions of ultraviolet light irradiation.
Figure 4:
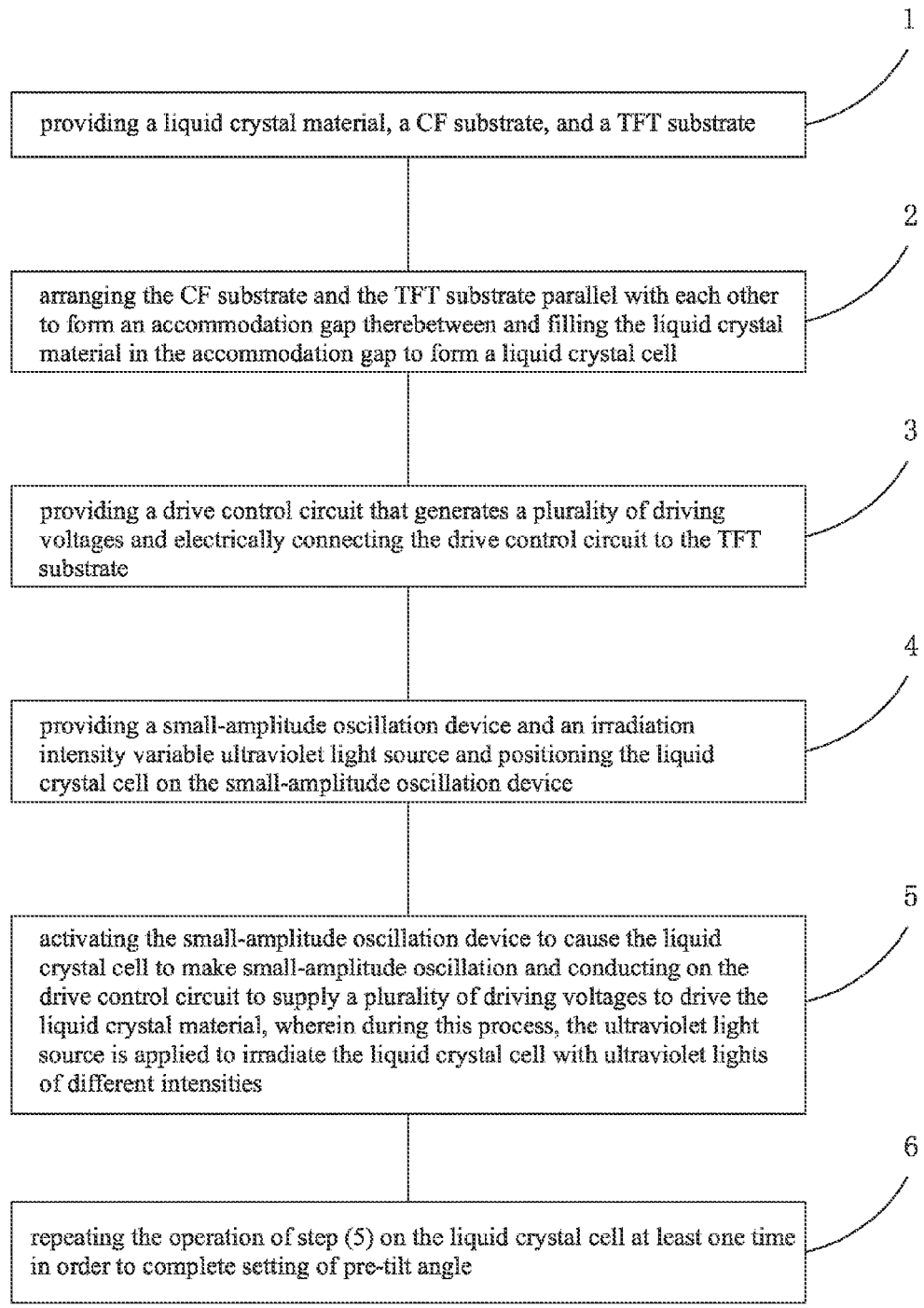
FIG. 4 is a flow chart illustrating a method for setting a pre-tilt angle of liquid crystal molecules according to the present invention.
Figure 5:
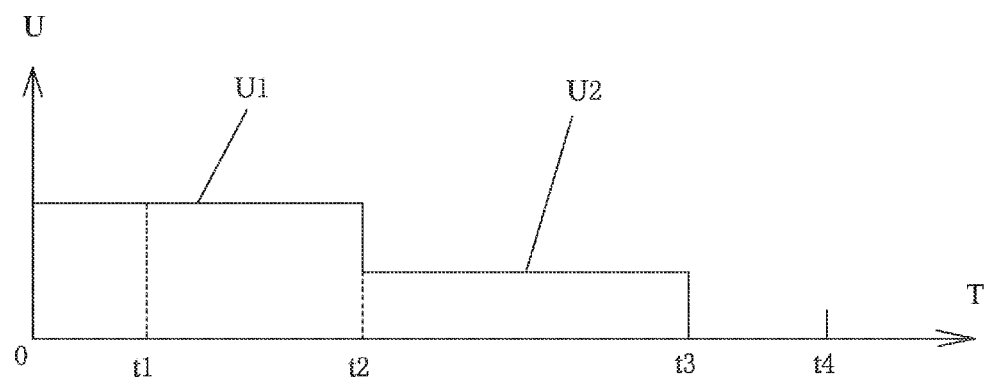
FIG. 5 is a schematic view showing variation of an output of voltage level of a drive control circuit with respect to time in Step 5 of the method for setting a pre-tilt angle of liquid crystal molecules according to the present invention.
Figure 6:
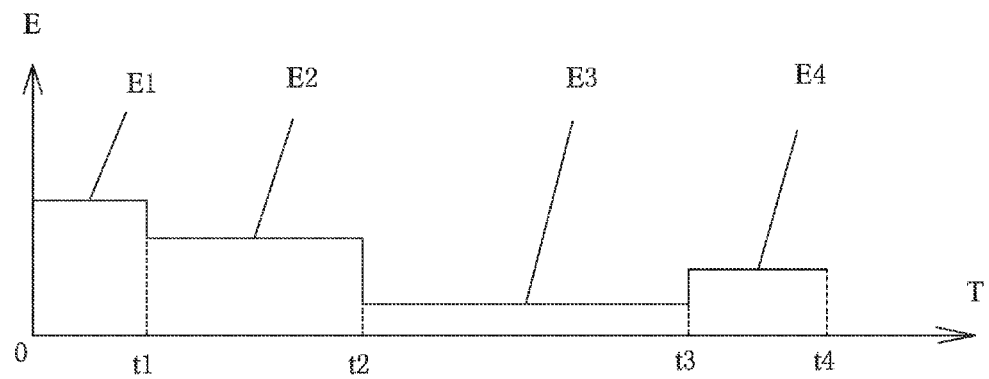
FIG. 6 is a schematic view showing variation of irradiation intensity of ultraviolet light source with respect to time in Step 5 of the method for setting a pre-tilt angle of liquid crystal molecules according to the present invention.

Referring to FIGS. 4-6, the present invention provides a method for setting a pre-tilt angle of liquid crystal molecules, which comprises the following steps:

Step 1: providing a liquid crystal material, a CF (Color Filter) substrate and a TFT (Thin-Film Transistor) substrate.

The TFT substrate comprises light-shielding patterns formed thereon. The liquid crystal material comprises photo- or heat-polymerizable monomers and liquid crystal molecules. The photo- or heat-polymerizable monomers get polymerized when irradiated with ultraviolet light and the stronger the irradiation intensity is, the fast the polymerization will be.

Step 2: arranging the CF substrate and the TFT substrate parallel with each other to form an accommodation gap therebetween and filling the liquid crystal material in the accommodation gap to form a liquid crystal cell.

The liquid crystal material is filled and sealed in the accommodation gap formed between the CF substrate and the TFT substrate.

Step 3: providing a drive control circuit that generates a plurality of driving voltages and electrically connecting the drive control circuit to the TFT substrate.

The drive control circuit drives the liquid crystal molecules of the liquid crystal material to rotate. When the drive circuit supplies no driving voltage, the liquid crystal molecules are perpendicular to the CF substrate or the TFT substrate.

In the instant preferred embodiment, the drive control circuit generates high and low levels and the change of the drive control circuit from the high level to low level is done in a continuous manner. The high level causes the liquid crystal molecules to makes a small angle rotation, while low level is insufficient to cause the liquid crystal molecules to make a small angle rotation.

Step 4: providing a small-amplitude oscillation device and an irradiation intensity variable ultraviolet light source and positioning the liquid crystal cell on the small-amplitude oscillation device.

The small-amplitude oscillation device causes the liquid crystal cell to make oscillation of small amplitude and the small amplitude is insufficient to cause a change of the rotation angle of the liquid crystal molecules and is also insufficient to cause a large scale of flow of the liquid crystal molecules.

The ultraviolet light source generates first, second, third, and fourth irradiation intensities E1, E2, E3, E4, wherein the first irradiation intensity E1>the second irradiation intensity E2>the third irradiation intensity E3>the fourth irradiation intensity E4.

Step 5: activating the small-amplitude oscillation device to cause the liquid crystal cell to make small-amplitude oscillation and conducting on the drive control circuit to supply a plurality of driving voltages to drive the liquid crystal material, wherein during this process, the ultraviolet light source is applied to irradiate the liquid crystal cell with ultraviolet lights of different intensities.

Step 5 comprises the following steps:

Step 501: activating the small-amplitude oscillation device to cause the liquid crystal cell to make small-amplitude oscillation.

Step 502: in a first time period (t1), conducting on the drive control circuit to output the high level U1 to cause the liquid crystal molecules to make a small angle rotation and also applying the first irradiation intensity E1 of the ultraviolet light source to irradiate the liquid crystal cell so as to make the photo- or heat-polymerizable monomers start to polymerize.

Being driven by the high level, the liquid crystal molecules undergo fast rotation of a small angle to have the rotation angle meet the requirement for pre-tilt angle. In the instant preferred embodiment, the first time period (t1) is controlled to be a short period. This prevents the photo- or heat-polymerizable monomers from being set in an over-cured condition and thus losing flexibility thereof due to excessively intense irradiation of light, so as to ensure optic characteristics of the liquid crystal molecules.

Step 503: in a second time period (t2-t1), conducting on the drive control circuit to output the high level U1 and also applying the second irradiation intensity E2 of the ultraviolet light source to irradiate the liquid crystal cell.

Using the relatively weak second irradiation intensity E2 of the ultraviolet light source to irradiate the liquid crystal cell can prevent the photo- or heat-polymerizable monomers from over-curing while ensuring sufficient polymerization of the photo- or heat-polymerizable monomers.

Step 504: in a third time period (t3-t2), conducting on the drive control circuit to output the low level U2 and also applying the fourth irradiation intensity E4 of the ultraviolet light source to irradiate the liquid crystal cell.

Using a relatively long period (the third time period) to perform polymerization of the photo- or heat-polymerizable monomers under the low level U2 can further ensure the sufficiency of polymerization.

Step 505: in a fourth time period (t4-t3), shutting off the drive control circuit and applying the third irradiation intensity E3 of the ultraviolet light source to irradiate the liquid crystal cell so as to have the photo- or heat-polymerizable monomers sufficiently polymerized.

The first time period (t1)<the second time period (t2-t1) <the fourth time period (t3-t2)<the third time period (t4-t3).

Step 6: repeating the operation of Step 5 on the liquid crystal cell at least one time in order to complete setting of pre-tilt angle.

In Step 6, the operation of Step 5 is repeated and the number of repeating is determined according to practical settings.

It is noted that in Step 5, a small-amplitude oscillation device is used to cause the liquid crystal cell to make small-amplitude oscillation, so that liquid crystal molecules contained in the liquid crystal cell may flow in a small scale, whereby the photo- or heat-polymerizable monomers located under the light shielding portions of the TFT substrate may flow in a small scale to a non-shielded portion to be irradiated by the ultraviolet light and thus get polymerized so as to ensure sufficient polymerization of the photo- or heat-polymerizable monomers and prevent the occurrence of image sticking phenomenon.

In summary, the present invention provides a method for setting a pre-tilt angle of liquid crystal molecules, which applies ultraviolet lights of different intensities to carry out irradiation in different time periods, uses different driving voltages to drive liquid crystal molecules, and also applies a small-amplitude oscillation device to cause a liquid crystal cell to make small-amplitude oscillation so as to have all liquid crystal molecules to be irradiated by ultraviolet to the greatest extent, making the photo- or heat-polymerizable monomers sufficiently polymerized to eliminate image sticking phenomenon. Further, the liquid crystal molecules show consistent pre-tilt angle so that the liquid crystal material shows consistent light transmittance thereby ensuring the contrast of a liquid crystal display device, improving the performance of the liquid crystal display device, and also increasing the manufacturing efficiency of the liquid crystal display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for setting a pre-tilt angle of liquid crystal molecules, comprising the following steps:
    (1) providing a liquid crystal material, a CF substrate, and a TFT substrate;
    (2) arranging the CF substrate and the TFT substrate parallel with each other to form an accommodation gap therebetween and filling the liquid crystal material in the accommodation gap to form a liquid crystal cell;
    (3) providing a drive control circuit that generates a plurality of driving voltages and electrically connecting the drive control circuit to the TFT substrate;
    (4) providing a small-amplitude oscillation device and an irradiation intensity variable ultraviolet light source and positioning the liquid crystal cell on the small-amplitude oscillation device;
    (5) activating the small-amplitude oscillation device to cause the liquid crystal cell to make small-amplitude oscillation and conducting on the drive control circuit to supply a plurality of driving voltages to drive the liquid crystal material, wherein during this process, the ultraviolet light source is applied to irradiate the liquid crystal cell with ultraviolet lights of different intensities; and
    (6) repeating the operation of step (5) on the liquid crystal cell at least one time in order to complete setting of pre-tilt angle.

2. The method for setting a pre-tilt angle of liquid crystal molecules as claimed in claim 1, wherein the TFT substrate comprises light-shielding patterns formed thereon.

3. The method for setting a pre-tilt angle of liquid crystal molecules as claimed in claim 1, wherein the liquid crystal material comprises photo- or heat-polymerizable monomers and liquid crystal molecules, the photo- or heat-polymerizable monomers being polymerizable when irradiated with ultraviolet light.

4. The method for setting a pre-tilt angle of liquid crystal molecules as claimed in claim 3, wherein the drive control circuit drives the liquid crystal molecules of the liquid crystal material to rotate and when the drive circuit supplies no driving voltage, the liquid crystal molecules are perpendicular to the CF substrate or the TFT substrate.

5. The method for setting a pre-tilt angle of liquid crystal molecules as claimed in claim 3, wherein the small-amplitude oscillation device of step (5) causes the liquid crystal cell to make oscillation of small amplitude and the small amplitude is insufficient to cause a change of the rotation angle of the liquid crystal molecules and is also insufficient to cause a large scale of flow of the liquid crystal molecules.

6. The method for setting a pre-tilt angle of liquid crystal molecules as claimed in claim 3, wherein the drive control circuit generates high and low levels, the high level causing the liquid crystal molecules to make a small angle rotation, the low level being insufficient to cause the liquid crystal molecules to make a small angle rotation.

7. The method for setting a pre-tilt angle of liquid crystal molecules as claimed in claim 6, wherein the ultraviolet light source generates first, second, third, and fourth irradiation intensities, the first irradiation intensity>the second irradiation intensity>the third irradiation intensity>the fourth irradiation intensity.

8. The method for setting a pre-tilt angle of liquid crystal molecules as claimed in claim 7, wherein step (5) comprises the following steps:
    (A) activating the small-amplitude oscillation device to cause the liquid crystal cell to make small-amplitude oscillation;
    (B) in a first time period, conducting on the drive control circuit to output the high level to cause the liquid crystal molecules to make a small angle rotation and also applying the first irradiation intensity of the ultraviolet light source to irradiate the liquid crystal cell so as to make the photo- or heat-polymerizable monomers start to polymerize;
    (C) in a second time period, conducting on the drive control circuit to output the high level and also applying the second irradiation intensity of the ultraviolet light source to irradiate the liquid crystal cell;
    (D) in a third time period, conducting on the drive control circuit to output the low level and also applying the fourth irradiation intensity of the ultraviolet light source to irradiate the liquid crystal cell; and
    (E) in a fourth time period, shutting off the drive control circuit and applying the third irradiation intensity of the ultraviolet light source to irradiate the liquid crystal cell so as to have the photo- or heat-polymerizable monomers sufficiently polymerized.

9. The method for setting a pre-tilt angle of liquid crystal molecules as claimed in claim 8, wherein the first time period<the second time period<the fourth time period<the third time period.

10. A method for setting a pre-tilt angle of liquid crystal molecules, comprising the following steps:
    (1) providing a liquid crystal material, a CF substrate, and a TFT substrate;
    (2) arranging the CF substrate and the TFT substrate parallel with each other to form an accommodation gap therebetween and filling the liquid crystal material in the accommodation gap to form a liquid crystal cell;
    (3) providing a drive control circuit that generates a plurality of driving voltages and electrically connecting the drive control circuit to the TFT substrate;
    (4) providing a small-amplitude oscillation device and an irradiation intensity variable ultraviolet light source and positioning the liquid crystal cell on the small-amplitude oscillation device;
    (5) activating the small-amplitude oscillation device to cause the liquid crystal cell to make small-amplitude oscillation and conducting on the drive control circuit to supply a plurality of driving voltages to drive the liquid crystal material, wherein during this process, the ultraviolet light source is applied to irradiate the liquid crystal cell with ultraviolet lights of different intensities; and
    (6) repeating the operation of step (5) on the liquid crystal cell at least one time in order to complete setting of pre-tilt angle;
    wherein the TFT substrate comprises light-shielding patterns formed thereon;
    wherein the liquid crystal material comprises photo- or heat-polymerizable monomers and liquid crystal molecules, the photo- or heat-polymerizable monomers being polymerizable when irradiated with ultraviolet light;
    wherein the drive control circuit drives the liquid crystal molecules of the liquid crystal material to rotate and when the drive circuit supplies no driving voltage, the liquid crystal molecules are perpendicular to the CF substrate or the TFT substrate;

wherein the small-amplitude oscillation device of step (5) causes the liquid crystal cell to make oscillation of small amplitude and the small amplitude is insufficient to cause a change of the rotation angle of the liquid crystal molecules and is also insufficient to cause a large scale of flow of the liquid crystal molecules;

wherein the drive control circuit generates high and low levels, the high level causing the liquid crystal molecules to make a small angle rotation, the low level being insufficient to cause the liquid crystal molecules to make a small angle rotation;

wherein the ultraviolet light source generates first, second, third, and fourth irradiation intensities, the first irradiation intensity>the second irradiation intensity>the third irradiation intensity>the fourth irradiation intensity;

wherein step (5) comprises the following steps:

(A) activating the small-amplitude oscillation device to cause the liquid crystal cell to make small-amplitude oscillation;

(B) in a first time period, conducting on the drive control circuit to output the high level to cause the liquid crystal molecules to make a small angle rotation and also applying the first irradiation intensity of the ultraviolet light source to irradiate the liquid crystal cell so as to make the photo- or heat-polymerizable monomers start to polymerize;

(C) in a second time period, conducting on the drive control circuit to output the high level and also applying the second irradiation intensity of the ultraviolet light source to irradiate the liquid crystal cell;

(D) in a third time period, conducting on the drive control circuit to output the low level and also applying the fourth irradiation intensity of the ultraviolet light source to irradiate the liquid crystal cell; and (E) in a fourth time period, shutting off the drive control circuit and applying the third irradiation intensity of the ultraviolet light source to irradiate the liquid crystal cell so as to have the photo- or heat-polymerizable monomers sufficiently polymerized; and wherein the first time period<the second time period<the fourth time period<the third time period.

* * * * *